Aug. 6, 1963 W. R. GARRETT 3,099,918
RESILIENT ROTARY DRIVE FLUID CONDUIT
Filed Aug. 9, 1961 2 Sheets-Sheet 1
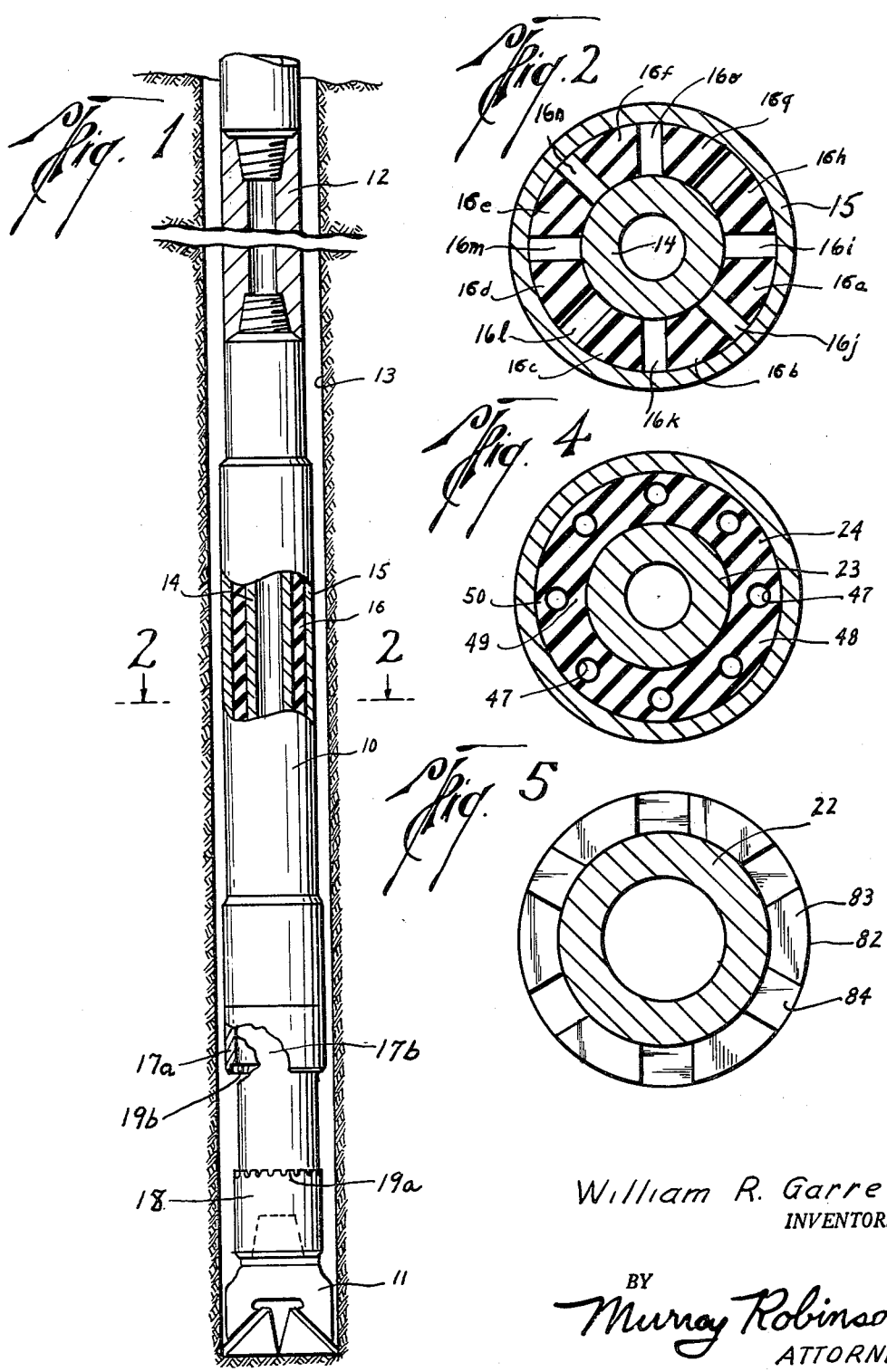
William R. Garrett
INVENTOR.
BY Murray Robinson
ATTORNEY

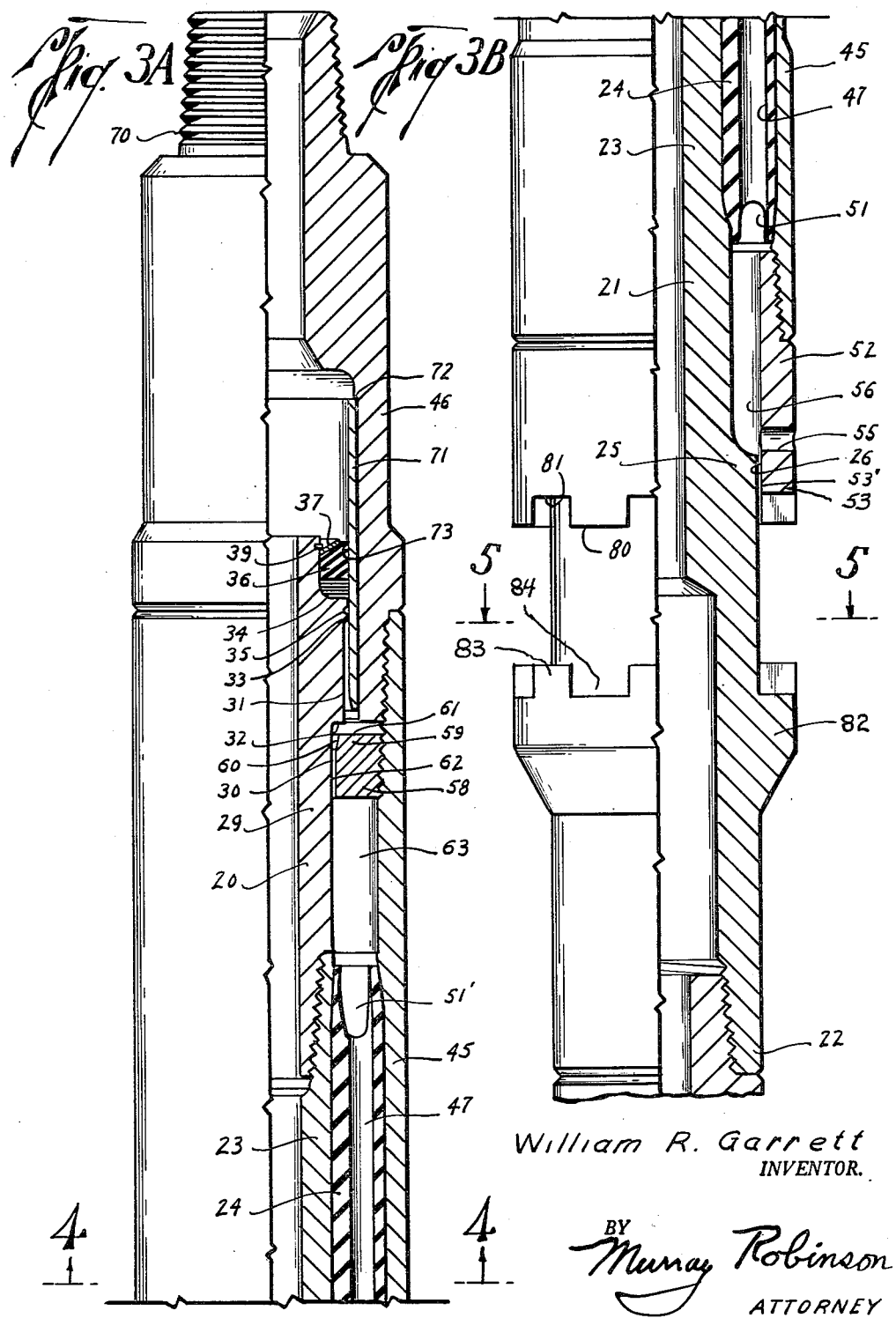

United States Patent Office 3,099,918
Patented Aug. 6, 1963

3,099,918
RESILIENT ROTARY DRIVE FLUID CONDUIT
William R. Garrett, Midland, Tex., assignor to Drilco
Oil Tools, Inc., a corporation of Texas
Filed Aug. 9, 1961, Ser. No. 130,325
16 Claims. (Cl. 64—27)

This invention pertains to drill strings used in the rotary method of drilling holes, e.g. oil and gas wells, and more particularly to resilient rotary drive fluid conduit connections used in such drill strings, especially between the drill bit and drill collar, to dampen vibrations and reduce impacts ordinarily transmitted from the bit to the collars and drill pipe thereabove.

Resilient rotary drive fluid conduit connections of the above type comprise an inner pipe, an outer tube coaxial therewith, and a rubber sleeve in an annular space formed between the outside of the pipe and the inside of the tube, with suitable arrangements for transmitting torsional, axial, and other forces through the rubber sleeve between pipe and tube. Such a connection is disclosed in my copending United States patent application Serial Number 53,268 filed August 31, 1960, now Patent No. 3,033,011, entitled Resilient Rotary Drive Fluid Conduit Connection, wherein it is disclosed that the rubber sleeve is molded in situ and thus vulcanized to both the pipe and tube, the sleeve being provided with axially extending interior spaces providing surface areas to relieve the shrinkage stresses during molding, a seal being provided between the pipe and tube to prevent fluid flow through the axially extending spaces, and lateral guides being provided at each end of the connection between the pipe and tube to relieve the sleeve of radial stresses due to bending moments and side thrusts.

According to the present invention an emergency clutch is provided, engageable in the event of failure of the rubber sleeve, whereby torsional forces can still be transmitted between pipe and tube. As in the connection disclosed in my aforementioned copending application, there are also provided stops limiting the relative axial movement of pipe and tube thereby not only limiting the axial strain imposed on the rubber sleeve but insuring that the connection can transmit axial forces even if the rubber sleeve fails.

For a detailed description of preferred embodiments of the invention, reference will now be made to the accompanying drawings wherein:

FIGURE 1 is an elevation showing a connection embodying the invention disposed between a drill bit and a drill collar forming therewith the lower end of a drill string;

FIGURE 2 is a section taken on line 2—2 of FIGURE 1;

FIGURES 3A and 3B together form an elevation, partly in section, showing a modified form of connection to a larger scale;

FIGURE 4 is a section taken on line 4—4 of FIGURE 3A;

FIGURE 5 is a section taken on line 5—5 of FIGURE 3B.

Referring first to FIGURE 1, there is shown a connection 10 embodying the invention. The connection is disposed between a drill bit 11 therebelow and a drill collar sub 12 thereabove. The drill bit, drill collar sub and connection therebetween are shown in the bottom of well 13.

The connection includes a pipe 14, tube 15 therearound, and rubber sleeve 16 therebetween. The rubber sleeve is molded in situ and thus bonded by vulcanization to the pipe and tube. As shown in FIGURE 2 the sleeve 16 is circumferentially divided into a plurality of arcuate sections 16a–16H with spaces 16i–16o therebetween, each section extending uninterruptedly axially of the sleeve from one end thereof nearly to the other end, the imperforate terminal portion of the sleeve sealing off the spaces through the sleeve against axial flow of fluid therethrough.

Inside the lower part of the tube 15 is screwed a short nipple 17a which telescopes over the enlarged lower end 17b of pipe 14. Together these form a lateral guide means. A similar lateral guide means (not shown) is formed at the upper end of the connection.

Below enlarged portion 17b on the pipe is formed a further enlarged portion 18b providing an annular upwardly facing shoulder into the end of which are milled slots leaving teeth 19a therebetween. Similar slots are milled inside the lower end of nipple 17a forming teeth 19b therebetween. The teeth 19a and 19b provide clutch means whereby the pipe 14 can be engaged with the tube 15 to transmit torsional forces therebetween if the rubber sleeve 16 has ruptured. The tube 15 is lowered relative to the pipe 14 in order to engage the clutch, and thereafter drilling can proceed. The engagement of tooth crests with the valleys between the teeth also limits relative axial travel of the pipe and tube in the one direction. Plain abutting shoulders (not shown) adjacent the lateral guide means at the upper end of the connection provide means to limit relative axial travel of pipe and tube in the opposite direction.

It will be understood however that in the embodiment just described, when the sleeve 16 ruptures, the fluid seal formed by the imperforate end thereof will also have ruptured so that some of the drilling fluid will be diverted from the bit. With low fluid pressures and bits not relying on jet action, such an arrangement is satisfactory, but for higher fluid pressures, especially with jet bits, the modification shown in FIGURES 3A and 3B is preferred.

Referring now to FIGURES 3A and 3B, the modified connection there shown in detail includes a pipe made up of a nipple 20 threadedly connected to a hollow mandrel 21 therebelow. The mandrel includes a threaded box 22 at its lower end for making a threaded connection with a pin on the top of a bit, such as bit 11 of FIGURE 1. The mandrel further includes a drive shaft 23 at its upper end to the outer periphery of which is bonded rubber sleeves 24. Between the drive shaft and the box the mandrel further includes a guide 25 whose outer periphery 26 may if desired to be provided with wear resistant hard metal bands.

The nipple 20 includes a guide 29 whose outer periphery 30 may also, if desired, be provided with wear resistant hard metal bands. The nipple 20 further includes a stop 31 having a downwardly facing shoulder 32. The nipple 20 further includes a backup body 33 having an upwardly facing shoulder 34 and a peripheral annular wear indicator groove 35. A slush pump piston type seal ring 36 is disposed around the upper end of nipple 20 against shoulder 34. An annular apertured dished end plate 37 is disposed around nipple 20 above seal ring 36 and is held thereagainst by a split elastic ring 38 snapped into groove 39 in nipple 20.

The connection further includes a tube made up of a drive shell 45 threadedly connected to a nipple 46 thereabove and a shoe 52 therebelow.

The drive shell 45 is bonded at its inner periphery to the outer periphery of sleeve 24. There are a plurality of axial holes 47 through sleeve 24, as best shown in FIGURE 4. As shown in FIGURE 4, the axial holes 47 are symmetrically disposed around the axis of sleeve 24, being equally circumferentially spaced apart. The holes divide up the sleeve into a plurality of arcuate sections 48. The holes are nearer the outer periphery of the sleeve than the inner periphery, thereby maintaining more nearly uniform the amount of rubber in the inner and outer parts of the sleeve to more uniformly distribute load stresses thereon. Since the holes do not have a diameter equal to the full wall thickness of the rubber sleeve 24, there remain inner webs 49 and outer webs 50 between the arcuate sections 48, whereby the whole sleeve is integral. If the holes were made so large that the sections were completely separated, a construction such as that of FIGURE 2 would result. The holes could have rectangular or trapezoidal or other cross-sections instead of the circular cross-section shown. The holes are formed by suitable core rods held in place in the annulus between drive shaft 23 and drive shell 45 while the rubber is injected therebetween and vulcanized.

Referring again to FIGURES 3A and 3B the lower and upper ends of the sleeve are provided with fillets 51, 51' which exist prior to the vulcanizing of the sleeve and help prevent excessive shrinkage stresses at the ends of the sleeve, the fillets deepening during vulcanization of the sleeve.

The sleeve rubber should have as much resilience as possible, like natural rubber, and as much oil resistance as synthetic rubber such as nitrile rubber. As a compromise it is preferred to use neoprene rubber for the material of sleeve 24.

By providing holes and fillets to relieve the shrinkage stresses in rubber sleeve 24, the sleeve can be made with a larger length-thickness ratio than has heretofore been thought possible. Making the sleeve longer reduces the unit stress in the rubber for any given torque or axial load transmitted between pipe and tube. As shown in FIGURE 1, the sleeve has a length greater than its diameter.

It is also to be observed that making the sleeve thicker reduces the unit stress in the rubber for any given rotational displacement of the pipe and tube relative to each other. For this reason the outer periphery of the drive shaft and the inner periphery of the drive shell are made conical, e.g. 1/4 inch taper per foot as shown. The rubber sleeve 24 will preferably have a constant wall thickness, the taper, being equal. With this construction the rubber has a maximum thickness while maintaining the necessary wall thickness of drive shaft and drive shell to provide adequate strength thereof.

Shoe 52, screwed into the bottom end of shell 45, includes a guide 53 having an inner peripheral surface 53' which makes a sliding fit with outer peripheral surface 26 of guide 25. Guide 53 is free to move axially relative to guide 25 and to rotate thereon about their common axis but is held against lateral movement relative thereto. Shoe 52 also includes a vent 55 to the annular space 56 between shoe 51 and mandrel 21 below sleeve 24 and above guides 25, 53.

Into the upper end of shell 45 is screwed a ring including at its lower portion a guide 58 and at its upper portion a stop 59. Although shown integrally connected as one ring, guide 58 and stop 59 could be made as separate rings. Stop 59 has a bevel 60 around its upper inner peripheral edge and an upper surface 61 opposite shoulder 32 on stop 31. Stops 31 and 59 limit relative axial movement of the pipe and tube in one direction, whereby should the rubber sleeve 24 or its bonds to drive shaft 23 or drive shell 45 fail, the connection still will retain the bit when the drill collar is lifted.

Guide 58 has an outer peripheral surface 62 which makes a sliding fit with outer peripheral surface 30 of guide 29. Guide 58 is free to move axially relative to guide 29 and to rotate thereon about their common axis but is held against lateral movement relative thereto. The annular space 63 between the upper end of shell 45 and nipple 20 above sleeve 24 is vented by the holes 47 in the sleeve.

Guides 29, 58 above sleeve 24 and guides 25, 53 below sleeve 24 prevent bending stress being imposed on the sleeve.

The ring comprising guide 58 and stop 59, and the liner 70 now to be described, form additional parts of the tube previously referred to as including shell 45, nipple 46, and shoe 52.

Nipple 46 includes a threaded pin 70 at its upper end for making a threaded connection with a box on the bottom of the drill collar sub.

A liner 71 is press or shrink fitted within nipple 46 in fluid tight engagement therewith. The upper end of liner 71 engages against a downwardly facing locating shoulder 72 formed on the inner periphery of nipple 46. The inner periphery of liner 71 makes sliding sealing engagement with seal ring 36. Both liner 71 and seal ring 36 are replaceable. Seal ring 36 is made of rubber compound reinforced with canvas in the portion thereof adjacent backup body 33. The unreinforced portion of seal ring 36 adjacent end plate 37 is dished somewhat less than end plate 37 so as to allow room for expansion of the rubber, confined on its outer periphery by liner 71, such expansion occurring when the rubber heats or absorbs fluid. Since room is left for expansion, no undue stresses are imposed on seal ring 36 so that its life is prolonged. Also, the annular lip 73 of the seal ring remains free to flex outwardly against the liner under the pressure of fluid within the connection, e.g., drilling mud passing therethrough from the drill collar to the drill bit. The seal prevents loss of drilling mud and pressure through the holes 47 in sleeve 24.

Referring now to FIGURES 3B and 5, the lower end of guide 53 is shaped to provide teeth 80 with slots 81 therebetween. The mandrel 21 is provided with an enlargement or collar 82 whose upper end is shaped to provide teeth 83 and slots 84 correlative to those on guide 53. Normally the guide 53 and collar 82 are axially spaced apart but should the rubber sleeve 24 fail, the teeth and slots of the guide 53 and collar 82 may be engaged by lowering the tube relative to the pipe. There is thus provided a clutch means engageable and disengageable by relative axial motion of pipe and tube to enable torsional forces to be transmitted between pipe and tube when the clutch is engaged after failure of the rubber sleeve. The clutch parts also serve to limit relative axial motion of the pipe and tube in the one direction, just as do stops 31 and 59 in the opposite direction.

In the clutch means just described, it is to be noted that the teeth extend radially the full thickness of the collar and lower guide, thus providing maximum area of engagement for transmitting torsion. It is also to be noted that in the embodiment of FIGURES 3A and 3B, the sliding seal will allow the clutch to be engaged without spoiling the seal, the length of the liner being great enough to make sealing contact with the seal ring even when the tube is lowered relative to the pipe sufficient to engage the clutch. Therefore drilling may be continued with full fluid pressure at the bit.

It is further to be observed that the length of the upper and lower guides is at least as great as the axial distance the pipe and tube must move relative to each other for engagement of the clutch so that stability of the connection is maintained even if the rubber sleeve fails.

It is also to be observed that although the clutches as described hereinabove are especially useful with resilient rotary drive fluid connections of the type herein described, the clutches may be used in combination with other types of resilient rotary drive fluid conduit connections.

Instead of placing the subject connections between a drill bit and drill collar sub as shown, the drill collar sub can be omitted and a drill collar screwed directly to the top of the connection. In such case nipple 46 would be provided with a threaded box to accommodate the usual pin on the bottom of the drill collar. The box 22 at the bottom of the mandrel 21 can be replaced by a pin in case it is desired to connect directly to a bit having a box instead of the usual pin.

As shown, the upper threaded member, pin 70, is on the tube and the lower threaded member, box 22, is on the pipe, but this can be reversed, putting the upper threaded member on the pipe and the lower threaded member on the tube.

The clutch of the second described embodiment could also be used in the first described embodiment if desired, and vice versa.

While preferred embodiments of the invention have been shown and described, many modifications thereof can be made by one skilled in the art without departing from the spirit of the invention and it is desired to protect by Letters Patent all forms of the invention falling within the scope of the following claims:

1. A rotary drive fluid conduit connection comprising
   a pipe,
   a rubber sleeve around the outside of the pipe,
   a tube around the outside of the sleeve,
   said sleeve being bonded to said pipe and tube,
   said sleeve having a plurality of axially extending holes therein,
   a seal between said pipe and tube, and
   clutch means comprising annularly disposed teeth around said pipe and annularly disposed teeth around said tube normally axially spaced apart but engageable by relative axial motion of pipe and tube after failure of said rubber sleeve to transmit torsional forces between pipe and tube.

2. Combination of claim 1 wherein said seal is a solid rubber annulus integral with one end of said sleeve, said holes extending to the other end of said sleeve.

3. Combination of claim 1 wherein said holes extend all the way to both ends of said sleeve and said seal is an axially slidable seal separate from said sleeve, the seal having a length at least greater than the separation of said clutch teeth by the depth of the teeth.

4. Combination of claim 3 wherein said tube includes a nipple and a liner fitted inside said nipple in sealing engagement therewith, and said pipe includes a backup body and said seal is a rubber ring disposed against said body and in sliding sealing engagement with said liner, the length of the liner being greater than the axial separation of said clutch teeth by at least the depth thereof.

5. Combination of claim 1 with cooperating lateral guides on said pipe and tube at both ends of said sleeve, the guides engaging the pipe and tube throughout the full relative travel of pipe and tube between normal operating position and engagement of said clutch means.

6. Combination of claim 5 wherein the clutch teeth on the tube are disposed at the lower end of the lower guide and the teeth on the pipe are disposed on the upper end of an enlarged portion of the pipe spaced below said lower guide.

7. Combination of claim 6 wherein the clutch teeth at the lower end of the lower guide extend across the full radial extent thereof.

8. Combination of claim 6 wherein the clutch teeth at the lower end of the lower guide are interiorly disposed leaving the guide with a smooth outer periphery.

9. Combination of claim 8, said tube including a shell and a ring screwed into said shell at one end thereof surrounding said pipe, said ring having a portion forming the lateral guide on said tube at one end of said sleeve, said ring having another portion forming a stop on said tube, said pipe having a stop thereon adjacent said stop on the tube, said stops being spaced apart in the axial direction in the unloaded state of said connection but limiting relative axial movement of said pipe and sleeve in one direction when said connection is loaded, said pipe including a threaded box at one end of the connection for connection to a drill bit and said tube including a threaded member at the other end of the connection for connection to a portion of a drill string, said stops being disposed with the stop on the tube closer to said box than is the stop on the pipe so as to limit axial separation of said box and member, the clutch means limiting axial approach of said box and member.

10. A rotary drive fluid conduit connection comprising
    a pipe,
    a tube around the outside of the pipe and radially spaced therefrom leaving an annulus therebetween,
    a plurality of axially extending arcuate sections of rubber disposed in said annulus and circumferentially spaced apart,
    said sections being bonded to said pipe and said tube,
    a seal between said pipe and tube, and emergency clutch means comprising portions on said pipe and tube normally axially separated but engageable by relative axial motion of pipe and tube to transmit torque therebetween, said portions of the clutch means being engageable only after failure of said rubber sections to transmit torsional forces between pipe and tube.

11. A rotary drive fluid conduit connection comprising a pipe, a tube around the outside of the pipe, normal means for transmitting torque between pipe and tube including a rubber annulus, and emergency means for transmitting torque between pipe and tube including a clutch engageable by axial relative motion of pipe and tube only after said normal means has failed.

12. A rotary drive fluid conduit connection comprising
    a pipe,
    a tube around the outside of the pipe,
    normal means for transmitting torque and axial forces between pipe and tube including a rubber annulus, and
    emergency means for transmitting torque and axial forces between pipe and tube including a clutch engageable by axial relative motion of pipe and tube only after said normal means has failed.

13. Combination of claim 12 with cooperating lateral guides on said pipe and tube at both ends of said annulus, the guides engaging the pipe and tube throughout the full relative travel of pipe and tube between normal operating position and engagement of said clutch means.

14. Combination of claim 13 wherein said clutch includes annularly disposed teeth around said pipe and annularly disposed teeth around said tube, and wherein the clutch teeth on the tube are disposed at the lower end of the lower guide and the teeth on the pipe are disposed on the upper end of an enlarged portion of the pipe spaced below said lower guide.

15. Combination of claim 14 wherein the clutch teeth at the lower end of the lower guide extend across the full radial extent thereof.

16. Combination of claim 14 wherein the clutch teeth at the lower end of the lower guide are interiorly disposed leaving the guide with a smooth outer periphery.

References Cited in the file of this patent

UNITED STATES PATENTS

| 1,765,279 | Leverich | June 17, 1930 |
| 1,960,688 | Archer | May 29, 1934 |
| 2,572,307 | Brown | Oct. 23, 1951 |
| 2,727,368 | Morton | Dec. 20, 1955 |
| 2,852,231 | Le Bus | Sept. 16, 1958 |